(12) United States Patent
Hasch et al.

(10) Patent No.: US 10,509,106 B2
(45) Date of Patent: Dec. 17, 2019

(54) METHOD FOR CALIBRATING A RADAR SYSTEM

(71) Applicant: Robert Bosch GmbH, Stuttgart (DE)

(72) Inventors: Juergen Hasch, Stuttgart (DE);
Mekdes Girma, Gerlingen (DE);
Werner Soergel, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 15/535,321

(22) PCT Filed: Oct. 19, 2015

(86) PCT No.: PCT/EP2015/074138
§ 371 (c)(1),
(2) Date: Jun. 12, 2017

(87) PCT Pub. No.: WO2016/096199
PCT Pub. Date: Jun. 23, 2016

(65) Prior Publication Data
US 2017/0322288 A1 Nov. 9, 2017

(30) Foreign Application Priority Data

Dec. 15, 2014 (DE) .......... 10 2014 225 830

(51) Int. Cl.
*G01S 7/40* (2006.01)
*G01S 7/03* (2006.01)
(52) U.S. Cl.
CPC .......... *G01S 7/4008* (2013.01); *G01S 7/032* (2013.01); *G01S 7/4017* (2013.01);
(Continued)

(58) Field of Classification Search
CPC ...... G01S 7/4008; G01S 7/032; G01S 7/4017; G01S 7/4021; G01S 7/038; G01S 2007/406
(Continued)

(56) References Cited

U.S. PATENT DOCUMENTS

| | | | |
|---|---|---|---|
| 7,576,687 B2* | 8/2009 | Forstner | G01S 7/034 331/105 |
| 2008/0001810 A1* | 1/2008 | Forstner | G01S 7/032 342/175 |

(Continued)

FOREIGN PATENT DOCUMENTS

| | | |
|---|---|---|
| DE | 102009029052 A1 | 3/2011 |
| DE | 102012202007 A1 | 8/2013 |

(Continued)

OTHER PUBLICATIONS

Sarkas et al. ("A Fundamental Frequency 143-152 GHz Radar Transceiver with Built-In-Calibration and Self-Test", 2012 IEEE Compound Semiconductor Integrated Circuit Symposium (CSICS 2012): California, USA, Oct. 14-17, 2012, IEEE, ISBN:978-1-4673-0928-8).*

(Continued)

*Primary Examiner* — Peter M Bythrow
*Assistant Examiner* — Nuzhat Pervin
(74) *Attorney, Agent, or Firm* — Norton Rose Fulbright US LLP; Gerard Messina

(57) ABSTRACT

A radar system including a reference channel formed symmetrically in relation to a main channel, with a first oscillator, generating a first input signal, which is feedable to an antenna in the main channel, a reflected portion of the first input signal being feedable to a first mixer, the first input signal in the reference channel being feedable to a second mixer via a second directional coupler, with a second (Continued)

oscillator, generating a second input signal having a frequency differing from the first input signal in a defined way, which is feedable to the first and second mixers, the signal coming from the mixer of the main channel and the signal coming from the mixer of the reference channel being compared, and dimensioning a terminating impedance of the reference channel as a function of the comparison so that the output signals of the main and reference channels have identical properties.

5 Claims, 5 Drawing Sheets

(52) U.S. Cl.
CPC ............ *G01S 7/4021* (2013.01); *G01S 7/038* (2013.01); *G01S 2007/406* (2013.01)

(58) Field of Classification Search
USPC ........................................................ 342/174
See application file for complete search history.

(56) References Cited

U.S. PATENT DOCUMENTS

| | | | | |
|---|---|---|---|---|
| 2008/0191930 | A1* | 8/2008 | Banaszak | G01S 7/4021 342/93 |
| 2008/0278370 | A1* | 11/2008 | Lachner | G01S 7/03 342/200 |
| 2008/0287085 | A1* | 11/2008 | Forstner | G01S 7/032 455/293 |
| 2009/0015459 | A1* | 1/2009 | Mahler | G01S 7/023 342/22 |
| 2009/0023405 | A1* | 1/2009 | Forstner | G01S 7/034 455/115.1 |
| 2009/0189800 | A1* | 7/2009 | Benari | G01S 7/4052 342/134 |
| 2010/0013698 | A1* | 1/2010 | Borlez | G01S 7/032 342/61 |
| 2010/0037523 | A1* | 2/2010 | Oirsouw | E05F 15/603 49/32 |
| 2012/0086595 | A1* | 4/2012 | Borlez | G01S 7/032 342/175 |

FOREIGN PATENT DOCUMENTS

| | | | | |
|---|---|---|---|---|
| EP | 0797104 | A2 * | 9/1997 | ............... G01S 7/03 |
| JP | 2001099912 | A | 4/2001 | |
| JP | 2006030199 | A | 2/2006 | |
| JP | 2014072807 | A | 4/2014 | |

OTHER PUBLICATIONS

International Search Report for PCT/EP2015/074138, dated Oct. 19, 2015.
Ioannis Sarkas et al: "A Fundamental Frequency 143-152 GHz Radar Transceiver with Built-In Calibration and Self-Test", 2012 IEEE Compound Semiconductor Integrated Circuit Symposium (CSICS 2012) : La Jolla, California, USA, pp. 14-17, Oct. 2012, IEEE, Piscataway, NJ, XP032266279.

* cited by examiner

METHOD FOR CALIBRATING A RADAR SYSTEM

FIELD OF THE INVENTION

The present invention relates to a radar system and a method for calibrating a radar system.

BACKGROUND INFORMATION

In various radar systems, several problems are associated with systematic errors in the high-frequency front-end. In particular, a DC offset problem results in a reduction in the performance of a receiver and may thus reduce the detectability of a received signal.

Possible sources of high-frequency impairment in a heterodyne radar system are, in principle, shown in FIG. 1. A scatter signal $t_L$ of a first oscillator VC01 may spread to a first mixer 6; moreover, a scatter signal $t_{Ant}$ may be generated by an antenna 14 and by a connection element 13 due to a mismatch. Furthermore, interference signals $t_R$ are conceivable due to reflection by a cap element or radome 30 situated in front of antenna 14 and/or due to circuit inaccuracies.

All of the above-named systematic errors may result in a considerable reduction in the performance of the radar sensor, in particular in the case of short range measurements. In order to compensate for these systematic impairments, several studies have already been carried out.

"A fundamental frequency 143-152 GHz radar transceiver with built-in calibration and self-test" CSICS, 2013 describes a heterodyne radar transceiver that includes several self-test and calibration features to make possible a simple production test and a correction of analog front-end impairments.

Patent document DE 10 2009 029 052 A1 discusses a heterodyne radar system in which a reflection signal is formed as an intermediate frequency signal.

"A Digital Leakage Cancellation Scheme for Monostatic FMCW Radar", IEEE MTT-S Digest, 2004, describes a heterodyne circuitry based on digital real-time signal processing for eliminating leakage effects. Proposed is the generation of a signal having the same amplitude and opposite phase position in relation to the leakage signals to be canceled. However, systematic errors due to antenna or connection mismatch, as well as undesirable reflections in the case of presence of a radome are not considered.

Patent document DE 10 2012 202 007 A1 discusses a radar sensor including an offset compensation unit which generates a compensation signal to be transmitted to the receiver with the received signal.

SUMMARY OF THE INVENTION

It is therefore an object of the present invention to provide an improved radar system.

According to a first aspect, the objective is achieved using a radar system including:
a main channel; and
a reference channel formed symmetrically in relation to the main channel;
with the aid of a first oscillator, it being possible to generate a first input signal, which is feedable into the main channel of an antenna, a reflected portion of the first input signal being feedable to a first mixer;
the first input signal in the reference channel being feedable to a second mixer via a second directional coupler;
with the aid of a second oscillator, it being possible to generate a second input signal having a frequency which differs from the first input signal in a defined way, which is feedable to the first mixer and the second mixer;
the signal coming from the mixer of the main channel and the signal coming from the mixer of the reference channel being comparable with one another; and
it being possible to dimension a terminating impedance of the reference channel as a function of the comparison in such a way that the output signals of the main channel and of the reference channel have identical properties.

The symmetrical structure of the radar system takes advantage of the fact that systematic errors occur in both channels and may thus be calibrated in a similar manner. As a result, a convenient analog calibration of a heterodyne radar system is thus provided.

According to a second aspect, the objective is achieved using a method for calibrating a radar system, the radar system including:
a main channel and a reference channel formed symmetrically in relation to the main channel;
with the aid of a first oscillator, it being possible to generate a first input signal, which is feedable to an antenna in the main channel, a reflected portion of the first input signal being feedable to a first mixer;
the first input signal in the reference channel being feedable to a second mixer via a second directional coupler;
with the aid of a second oscillator, it being possible to generate a second input signal having a frequency which differs from the first input signal in a defined way, which is feedable to the first mixer and the second mixer;
the method including the following steps:
aligning the radar system to an area without a detectable target;
ascertaining a ratio between the output signal of the main channel and the output signal of the reference channel at least three times at different terminating impedances of the reference channel in each case;
ascertaining the resulting reflection coefficients from the ascertained ratios;
ascertaining a calibration coefficient of the antenna from the reflection coefficients; and
setting the terminating impedance of the reference channel with the aid of the impedance tuner to an impedance which corresponds to the calibration coefficient.

Further exemplary embodiments of the radar system and the method are the subject matter of the further descriptions herein.

An advantageous refinement of the radar system is characterized in that the reference channel has an impedance tuner, with the aid of which the terminating impedance of the reference channel is settable. In this way, a terminating impedance of the reference channel may be set conveniently, in which all systematic errors of the entire radar system are calibrated out.

Another advantageous refinement of the radar system is characterized in that a correction coefficient ascertained from the output signals of the main channel and the reference channel may be used for setting the terminating impedance of the reference channel. In this way, error vectors are ascertained, as a result of which a principle similar to a calibration principle of a one-port network analyzer is applied.

Another advantageous refinement of the radar system provides that the correction coefficient is ascertainable with the aid of a digital control device, the correction coefficient being converted into a control signal for the impedance tuner, it being possible to feed the control signal to the digital tuner with the aid of the control device. In this way, the calibration or correction coefficient of the heterodyne radar system may be calculated in a simple manner using known principles.

The present invention is described in detail below to include additional features and advantages based on multiple drawings. Here, all features constitute the subject matter of the present invention irrespective of their presentation in the description and in the drawings as well as irrespective of their back-reference in the patent claims. The figures are in particular intended to illustrate the principles which are essential to the present invention. Identical or functionally corresponding elements have the same reference numerals.

DETAILED DESCRIPTION

Figure 1:
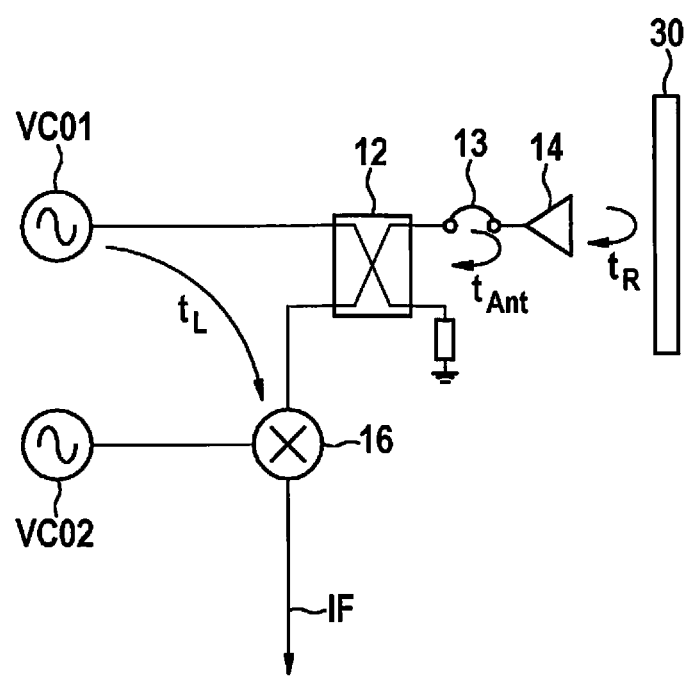
FIG. 1 shows a schematic block diagram of a conventional heterodyne radar system.
Figure 2:
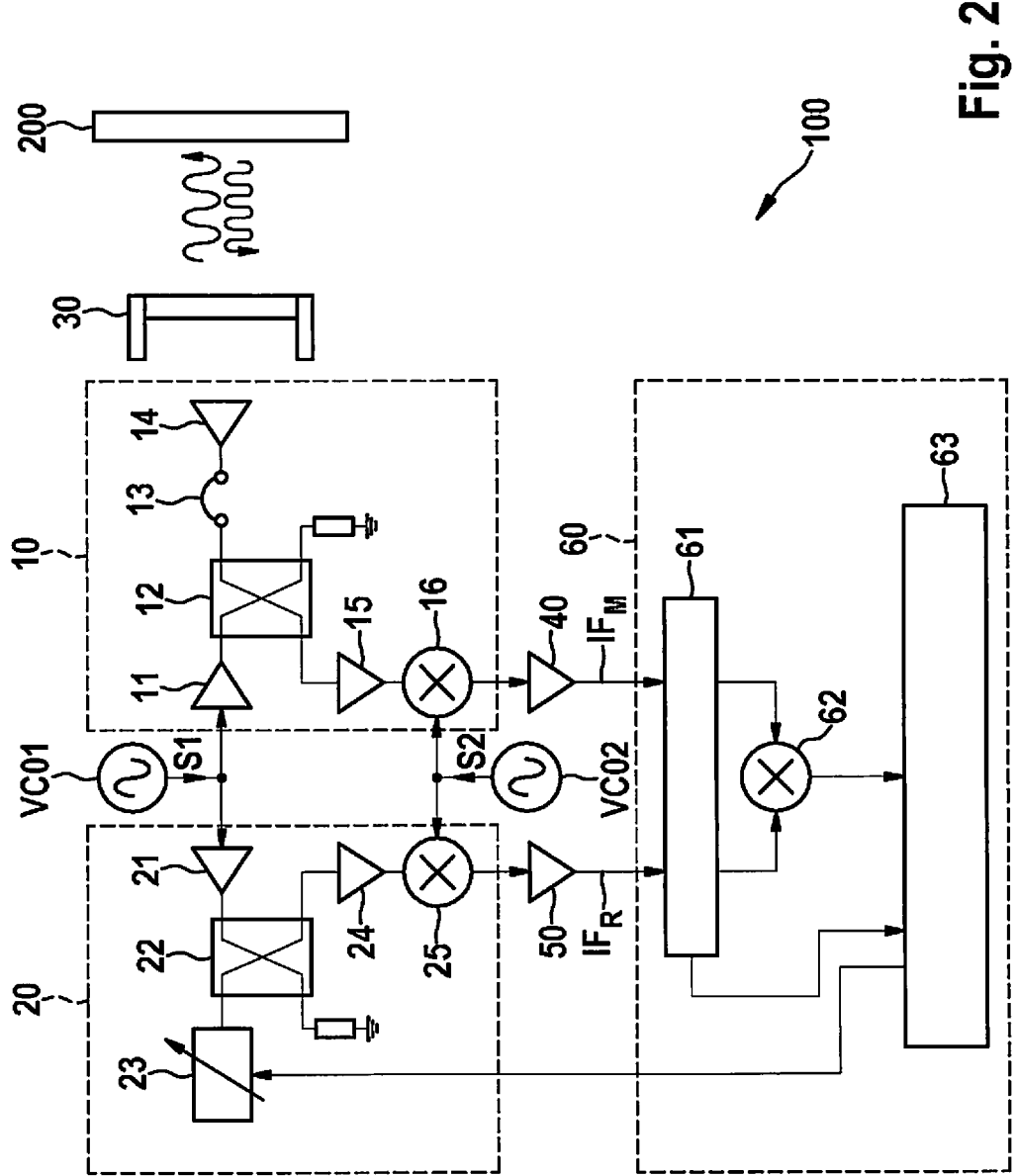
FIG. 2 shows a specific embodiment of a radar system according to the present invention.

FIG. 2 shows a block diagram of a specific embodiment of a radar system 100 according to the present invention. Apparent is a symmetrical structure of a heterodyne radar system 100 including a main channel 10 and a reference channel 20 which is configured symmetrically in relation to main channel 10. In this context, "symmetrical" means that identical elements having identical systematic errors are used in main channel 10 and in reference channel 20. The symmetry of main channel 10 and reference channel 20 is used for a self-test or a calibration process described in the following.

With the aid of a first oscillator or frequency generator VC01, a first signal S1 is fed into main channel 10 and into reference channel 20. In this case, signal S1 is transmitted in the main channel to an antenna 14 via a first power amplifier 11, a first directional coupler 12 and, a connection element 13. Signal S1 is emitted from antenna 14 as electromagnetic radiation and strikes a radome 30, which is provided to protect antenna 14 of radar system 100.

Radar system 100 may, for example, be implemented as an electronic element. The electromagnetic radiation is reflected by a target 200 and reaches a first small signal amplifier 15 via antenna 14, connection element 13 and first directional coupler 12 as an electrical signal. From first small signal amplifier 15, the signal enters a first mixer 16.

First mixer 16 mixes the signal together with a second signal S2 of a second oscillator VC02, the frequency of which is slightly different from the frequency of first signal S1 of first oscillator VC01, into a baseband, for example, a signal having a frequency of 100 MHz, which may subsequently be evaluated better.

In reference channel 20, the signal flow is similar to that in main channel 10 with the difference that instead of antenna 14 as the termination of reference channel 20, a digital impedance tuner 23 for setting a complex terminating impedance of reference channel 20 is provided. With the aid of digital impedance tuner 23, various complex terminating impedances may be set on reference channel 20, as a result of which an electrical output signal $IF_R$ of reference channel 20 may be influenced.

Second signal S2 is in each case fed to mixer 16, 25 of main channel 10 and of reference channel 20, mixers 16, 25 adding second signal S2 to the signals coming from directional couplers 12, 22 and amplified with the aid of small signal amplifiers 15, 24.

The signal coming from first mixer 16 of main channel 10 is fed to an A/D converter 40, as a result of which a digital signal $IF_M$ is formed, which is fed to a computing unit 61 of a control device 60. The signal coming from second mixer 25 of reference channel 20 is fed to an A/D converter 50, which converts the signal into a digital value $IF_R$, which is also fed to computing unit 61.

Control device 60 is provided for calculating a ratio from the two output signals $IF_M$, $IF_R$. For this purpose, computing unit 61 ascertains at least three reflection coefficients or factors from which a calibration coefficient $\Gamma_{Kal}$ for radar system 100 is ascertained. Calibration coefficient $\Gamma_{Kal}$ is converted into a control signal, which is fed to digital impedance tuner 23 by a control element 63 of control device 60. In this way, the result is achieved that output signal $IF_R$ of reference channel 20 corresponds in its electrical properties to output signal $IF_M$ of main channel 10, which corresponds to a calibrated state of radar system 100.

In this way, calibrated heterodyne radar system 100 may operate in normal operation without impairment by systematic errors when using its full bandwidth.

A functionality of the calibration according to the present invention, which calibrates out the systematic errors of radar system 100, will be described in greater detail below.

The monostatic design of heterodyne radar system 100 having only one antenna 14 in the transmission and reception path has the problem that the isolation between the transmission and reception path is not infinite, as a result of which an inadvertent leakage from the provided signal paths may occur.

Both oscillators VC01, VC02 have a certain phase noise, which is correlated by superposition in a mixing process, whereby the system accuracy may be significantly increased.

Figure 3:
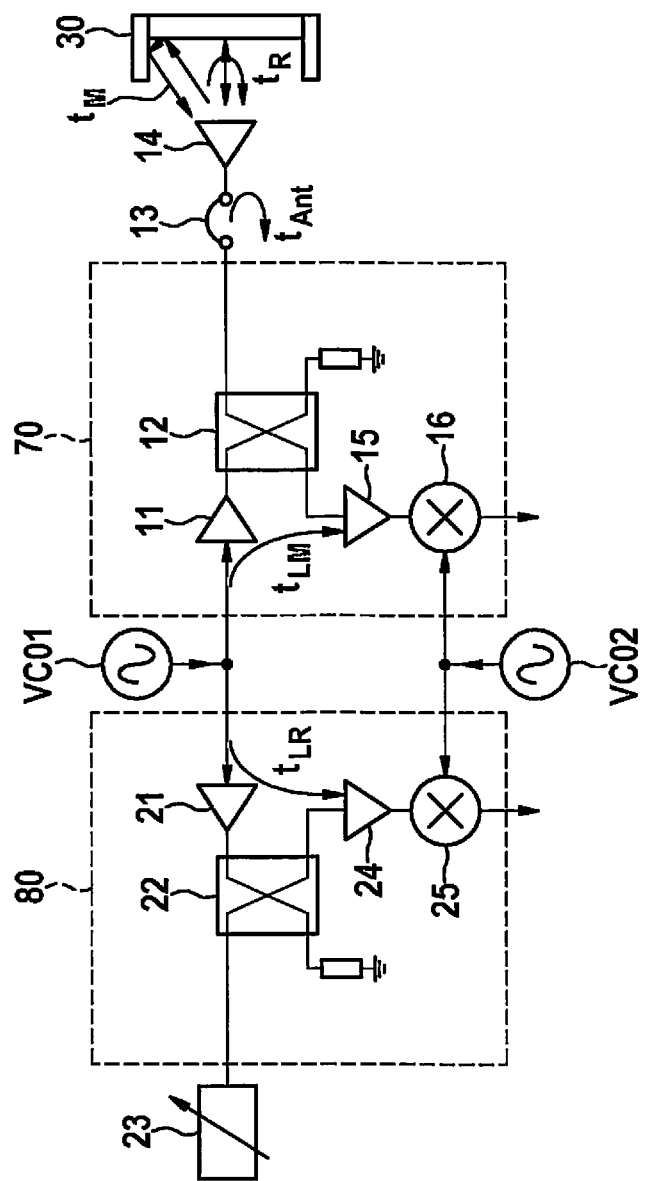
FIG. 3 shows a representation of a principle for the calibration according to the present invention of the radar system.

FIG. 3 shows a schematic circuit diagram for the representation of the symmetrical design of radar system 100. An error cell 70 for main channel 10 and an error cell 80 for reference channel 20 are apparent. Error cells 70, 80, which are designed symmetrically in relation to one another, are used for the calibration principle according to the present invention.

Figure 4:
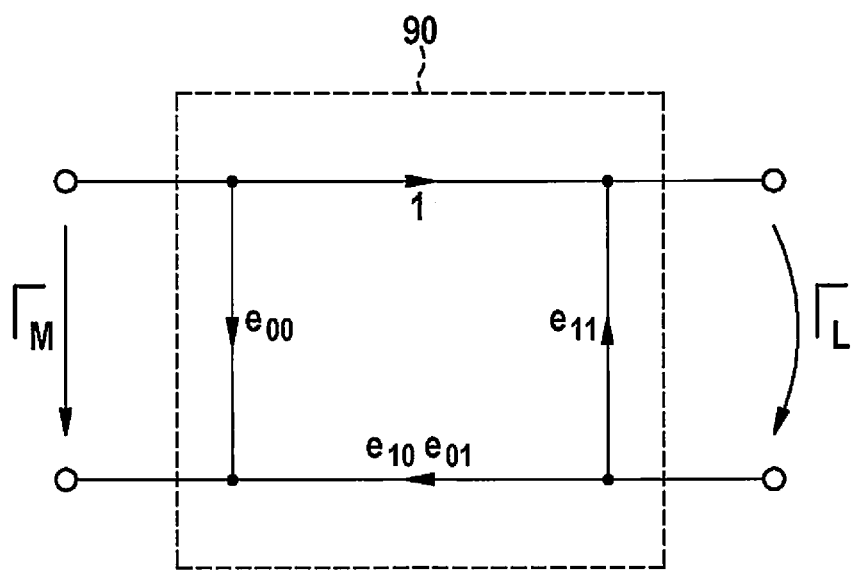
FIG. 4 shows a model for illustrating a principle of the calibration according to the present invention.

FIG. 4 shows a circuitry-wise model including an error cell 90, which is known, for example, from a calibration process of vector network analyzers. Error cells 70, 80 of FIG. 3 may be considered as error cell 90 of FIG. 4.

The model of FIG. 4 includes a system which includes, at an input and at an output, reflection coefficients representing particular load situations. Systematic errors are represented in error cell 90 using parameters which have the following meanings in connection with radar system 100 to be calibrated:

$e_{00}$ ... Directivity error
$e_{11}$ ... Source mismatch
$e_{10}, e_{01}$ ... Reflection tracking error
$\Gamma_M$ ... Measured reflection coefficient of a load
$\Gamma_L$ ... Instantaneous reflection coefficient of a load Reflection coefficient $\Gamma_M$ represents measured information which includes the systematic errors and information concerning the load, i.e., target 200, in the calibrated state of radar system 100, only the information concerning the load without the systematic errors being desired. Reflection coefficient $\Gamma_L$ of the load contains information concerning measured target 200.

Mathematically, the model of FIG. 4 may be represented as follows:

$$\Gamma_{Kal} = \begin{bmatrix} e00 & 1 \\ e10e01 & e11 \end{bmatrix} \quad (1)$$

Figure 5:
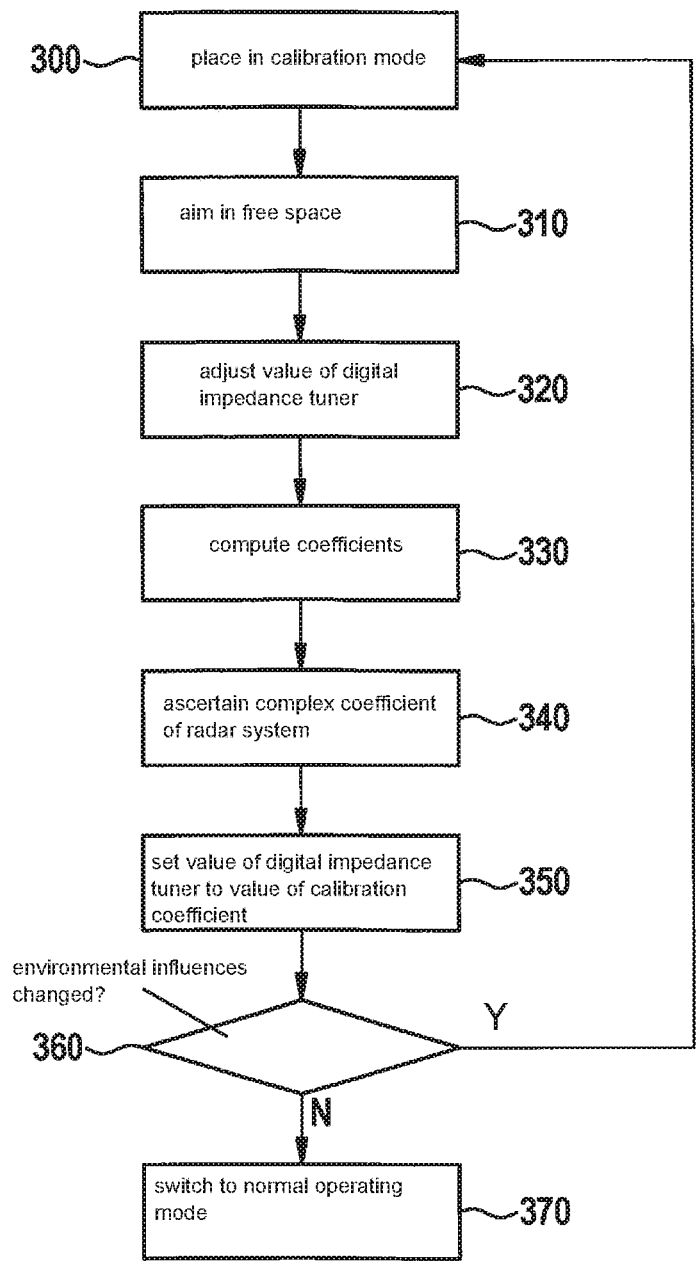
FIG. 5 shows a schematic flow chart of one specific embodiment of the method according to the present invention.

FIG. 5 shows a schematic flow chart of the method according to the present invention.

In a step 300, heterodyne radar system 100 to be calibrated is placed in a calibration mode. This may be carried out, for example, during the assembly of a radar sensor including radar system 100 into a motor vehicle. Alternatively, it is also possible to place radar system 100 into the calibration mode at desired, defined points in time, for example, with the aid of a control signal initiated by a vehicle operator.

In a step 310, radar system 100 is aimed at a free space without detectable targets 200. This ensures that only systematic errors of radar system 100 are considered for the calibration.

In a step 320, the value of digital impedance tuner 23 is adjusted to known values, amplitudes and phase differences of the electrical output voltages on reference channel 20 and on main channel 10 downstream of A/D converters 40, 50 being ascertained. For this purpose, digital impedance tuner 23 is adjusted to known values at least three times, as a result of which only output signal $IF_R$ of reference channel 20 changes because only this one is connected to digital impedance tuner 23. This is carried out at least three times in succession, as a result of which a linear system of equations having three unknowns is determined and may be solved. Optionally, it is also possible to carry out more than three measurements, as a result of which the ascertained error parameters are made more robust.

In a step 330, error coefficients are computed by solving the resulting linear equation system, similar to a one-port network vector analyzer procedure. The output signals of main channel 10 and of reference channel 20 may be represented by the following mathematical relationships:

$$IF_R = A_R \times \sin(2\pi ft + \phi 1) \quad (2)$$

$$IF_M = A_M \times \sin(2\pi ft + \phi 1) \quad (2)$$

including the parameters:
$IF_M$ ... Output signal main channel
$IF_R$ ... Output signal reference channel
$A_R$ ... Amplitude of the output signal of the reference channel
$A_M$ ... Amplitude of the output signal of the main channel
$\phi 1$ ... Phase of the output signal of the reference channel
$\phi 2$ ... Phase of the output signal of the main channel Reflection coefficient $\Gamma_M$ may be calculated from the following equation:

$$\Gamma_M = IF_M / IF_R = \Delta e^{j\Delta\theta} \quad (4)$$

The reflection coefficients may be ascertained by solving the following linear equation:

$$\begin{bmatrix} 1 & \Gamma L1\Gamma M1 & -\Gamma L1 \\ 1 & \Gamma L2\Gamma M2 & -\Gamma L2 \\ 1 & \Gamma L3\Gamma M3 & -\Gamma L3 \end{bmatrix} \times \begin{bmatrix} e00 \\ e11 \\ e\Delta \end{bmatrix} = \begin{bmatrix} \Gamma M1 \\ \Gamma M2 \\ \Gamma M3 \end{bmatrix} \quad (5)$$

where:

$$e_\Delta = e_{00}e_{11} - e_{10}e_{01} \quad (6)$$

After the calibration has been carried out, a reflection coefficient of a load which is either connected to reference channel 20 or to main channel 10 may be calculated from measured reflection coefficient $\Gamma_M$ using the following mathematical relationship:

$$\Gamma_L = (\Gamma_M - e_{11})/(e_{00} - e_\Delta \Gamma_M) \quad (7)$$

If no target 200 is present, $\Gamma_M = 1$, it then being possible to ascertain calibration coefficient $\Gamma_{Kal}$ from the following mathematical relationship:

$$\Gamma_{Kal} = \frac{1 - e00}{e11 - e\Delta} \quad (8)$$

In a step 340, complex calibration coefficient $\Gamma_{Kal}$ of radar system 100 is ascertained from equation (8).

Finally, in a step 350, the value of digital impedance tuner 23 is set to the value of calibration coefficient $\Gamma_{Kal}$ which ensures that radar system 100 operates without consideration of the systematic errors and is therefore calibrated.

For normal operational measurements of radar system 100 using targets 200, the terminating impedance of reference channel 20 is set to the value corresponding to calibration coefficient $\Gamma_{Kal}$, as a result of which reference channel 20 becomes a kind of "calibration channel" for main channel 10. In order to set the value of digital impedance tuner 23 to calculated value $\Gamma_{Kal}$, for example, a table including corresponding data of calibration coefficients and impedance values may be used.

After the calibration is completed, if the measurement is not changed, the phase and amplitude difference of the two channels 10, 20 is zero. In this way, the systematic error is completely compensated for.

In a step 360, a query is made as to whether any environmental influences have changed, for example, whether a temperature, a setting, an integration, etc. have changed. If this is not the case, for example, in the case where the radar transceiver is integrated into a chip, there is no process variation between reference channel 20 and main channel 10, as a result of which both channels 10, 20 are completely symmetrical. Thereafter, radar system 100 is switched to an operational normal operating mode in a step 370. Otherwise, the procedure is started again from the beginning at step 300.

Advantageously, the method according to the present invention makes it possible to eliminate systematic errors of radar system 100 while completely retaining the dynamic bandwidth of the radar system.

The radar calibration according to the present invention may in this way make a significant time gain possible and is very well suited to an iterative implementation under instantaneous operating conditions.

In summary, the present invention provides a self-calibrating, heterodyne radar system and a method for calibrating such a radar system, a calibration principle of network analyzers being used for the calibration. Advantageously, an exact operating behavior of the radar system, for example, in a radar sensor of a motor vehicle, may be provided in this way.

Although the present invention has been described above based on a specific embodiment, it is by no means limited thereto. Those skilled in the art will thus be able to implement specific embodiments of the present invention, which are not shown above, without departing from the essence of the present invention.

What is claimed is:

1. A radar system, comprising:
    a main channel;
    a reference channel formed symmetrically in relation to the main channel;
    a first oscillator configured to generate a first input signal, which is fed into an antenna in the main channel, a reflected portion of the first input signal being fed to a first mixer in the main channel;
    a second directional coupler in the reference channel, the second directional coupler being coupled to the first oscillator and being configured to feed the first input signal from the first oscillator to a second mixer in the reference channel;
    a second oscillator coupled to the first mixer and the second mixer, the second oscillator configured to generate a second input signal having a frequency which differs from the first input signal in a defined manner, and being configured to feed the second input signal to the first mixer and the second mixer;
    a first analog to digital (A/D) converter coupled to an output of the first mixer and configured to convert an analog signal output by the first mixer to a first digital signal;
    a second A/D converter coupled to an output of the second mixer and configured to convert an analog signal output by the second mixer to a second digital signal; and
    a digital control unit configured to compare the first digital signal from the first A/D converter with the second digital signal from the second A/D converter, and to automatically determine a calibration coefficient as a function of the comparison to dimension a terminating impedance of the reference channel as a function of the comparison so that the output signals of the main channel and of the reference channel have identical properties, the digital control unit further configured to automatically convert the calibration coefficient to a control signal; and
    a digital impedance tuner in the reference channel which receives the control signal from the digital control unit and configured to set the terminating impedance of the reference channel using the control signal from the digital control unit to an impedance corresponding to the calibration coefficient so that the output signal of the main channel and of the reference channel have identical properties.

2. A radar sensor, comprising:
    a radar system, including:
        a main channel; and
        a reference channel formed symmetrically in relation to the main channel;
        a first oscillator configured to generate a first input signal, which is fed into an antenna in the main channel, a reflected portion of the first input signal being fed to a first mixer in the main channel;
        a second directional coupler in the reference channel, the second directional coupler being coupled to the first oscillator and being configured to feed the first input signal from the first oscillator to a second mixer in the reference channel;
        a second oscillator coupled to the first mixer and the second mixer, the second oscillator configured to generate a second input signal having a frequency which differs from the first input signal in a defined manner, and being configured to feed the second input signal to the first mixer and the second mixer;
        a first analog to digital (A/D) converter coupled to an output of the first mixer and configured to convert an analog signal output by the first mixer to a first digital signal;
        a second A/D converter coupled to an output of the second mixer and configured to convert an analog signal output by the second mixer to a second digital signal;
        a digital control unit configured to compare the first digital signal from the first A/D converter with the second digital signal from the second A/D converter, and to automatically determine a calibration coefficient as a function of the comparison to dimension a terminating impedance of the reference channel as a function of the comparison so that output signals of the main channel and of the reference channel have identical properties, the digital control unit further configured to automatically convert the calibration coefficient to a control signal; and
        a digital impedance tuner in the reference channel which receives the control signal from the digital control unit and configured to set the terminating impedance of the reference channel using the control signal from the digital control unit to an impedance corresponding to the calibration coefficient so that the output signal of the main channel and of the reference channel have identical properties.

3. The radar sensor of claim 2, wherein the radar sensor is protected with a radome.

4. A method for calibrating a radar system, the method comprising:
    providing a radar system, the radar system including:
        a main channel;
        a reference channel formed symmetrically in relation to the main channel;
        a first oscillator configured to generate a first input signal, which is fed into an antenna in the main channel, a reflected portion of the first input signal being fed to a first mixer in the main channel;
        a second directional coupler in the reference channel, the second directional coupler being coupled to the first oscillator and being configured to feed the first input signal from the first oscillator to a second mixer in the reference channel;
        a second oscillator coupled to the first mixer and the second mixer, the second oscillator being configured to generate a second input signal having a frequency which differs from the first input signal in a defined manner, and being configured to feed the second input signal to the first mixer and the second mixer;

a first analog to digital (A/D) converter coupled to an output of the first mixer and configured to convert an analog signal output by the first mixer to a first digital signal;

a second analog to digital (A/D) converter coupled to an output of the second mixer and configured to covert an analog signal output by the second mixer to a second digital signal;

a digital control unit configured to receive the first digital signal from the first A/D converter to receive the second digital signal from the second A/D converter; and a digital impendence tuner in the reference channel which sets a terminating impedance of the reference channel;

aligning the radar system to an area without a detectable target; and with the radar system aligned to the area without a detectable target, operating the radar system in a calibration mode, the operating in the calibration mode including:

actuating the radar system to generate the first input signal and the second input signal and ascertaining, by the digital control unit, a ratio between the first digital signal and the second digital signal at least three times at different terminating impedances of the reference channel in each case, ascertaining, by the digital control unit, resulting reflection coefficients from the ascertained ratios, ascertaining, by the digital control unit, a calibration coefficient of the antenna from the reflection coefficients, and automatically setting, by the digital control unit, the terminating impedance of the reference channel with the digital impedance tuner to an impedance which corresponds to the calibration coefficient.

5. The method of claim 4, wherein the method tasks are performed at defined points in time.

* * * * *